United States Patent
Strock et al.

(10) Patent No.: US 8,876,470 B2
(45) Date of Patent: Nov. 4, 2014

(54) SPALL RESISTANT ABRADABLE TURBINE AIR SEAL

(75) Inventors: Christopher W. Strock, Kennebunk, ME (US); Paul W. Baumann, Amesbury, MA (US)

(73) Assignee: United Technologies Corporation, Hartford, CT (US)

( * ) Notice: Subject to any disclaimer, the term of this patent is extended or adjusted under 35 U.S.C. 154(b) by 731 days.

(21) Appl. No.: 13/171,569

(22) Filed: Jun. 29, 2011

(65) Prior Publication Data
US 2013/0004301 A1 Jan. 3, 2013

(51) Int. Cl.
*F01D 11/00* (2006.01)
*C23C 28/00* (2006.01)

(52) U.S. Cl.
CPC .............. *C23C 28/3215* (2013.01); *C23C 28/34* (2013.01); *C23C 28/3455* (2013.01); *C23C 28/347* (2013.01); *C23C 28/36* (2013.01); *C23C 28/322* (2013.01); *C23C 28/324* (2013.01); *C23C 28/345* (2013.01)
USPC ....................... 415/174.4; 415/216.1; 415/229

(58) Field of Classification Search
CPC .............. F01D 11/001; F05D 2230/31; F05D 2230/90; F05D 2240/125
USPC ................ 415/174.4, 174.5, 216.1, 229, 230; 427/446, 454, 456, 404, 405, 419.7; 428/627, 632–633, 623, 610
See application file for complete search history.

(56) References Cited

U.S. PATENT DOCUMENTS

| | | | |
|---|---|---|---|
| 3,545,944 A | 12/1970 | Emanuelson et al. | |
| 5,536,022 A * | 7/1996 | Sileo et al. | 277/415 |
| 6,004,362 A * | 12/1999 | Seals et al. | 51/295 |
| 6,102,656 A * | 8/2000 | Nissley et al. | 415/174.4 |
| 6,190,124 B1 * | 2/2001 | Freling et al. | 415/173.4 |
| 6,720,087 B2 | 4/2004 | Fried et al. | |
| 6,844,392 B2 | 1/2005 | Suman | |
| 6,896,485 B2 * | 5/2005 | Ohara et al. | 415/173.4 |
| 7,241,108 B2 * | 7/2007 | Lewis | 415/173.4 |
| 8,125,252 B2 * | 2/2012 | Ma | 327/153 |
| 2003/0126800 A1 | 7/2003 | Seth et al. | |
| 2004/0111975 A1 | 6/2004 | Suman | |
| 2006/0093736 A1 * | 5/2006 | Raybould et al. | 427/180 |
| 2008/0274336 A1 | 11/2008 | Merrill et al. | |
| 2009/0136740 A1 | 5/2009 | Reynolds et al. | |

FOREIGN PATENT DOCUMENTS

| | | | |
|---|---|---|---|
| EP | 2444513 A1 | 4/2002 | |
| EP | 1391537 A1 | 2/2004 | |
| EP | 2444524 A1 | 4/2012 | |
| WO | WO2004072357 A2 | 8/2004 | |

OTHER PUBLICATIONS

European Search Report, mailed Aug. 22, 2012.

* cited by examiner

*Primary Examiner* — Edward Look
*Assistant Examiner* — Jesse Prager
(74) *Attorney, Agent, or Firm* — Kinney & Lange, P.A.

(57) ABSTRACT

An abrasive coating for a rotor shaft, the abrasive coating having a metal bond coat layer on the rotor shaft and an abrasive layer over the bond layer for contact with vanes during operation of the rotor shaft. The abrasive coating includes a matrix containing a low strength filler having an increased concentration radially outward from the bond layer to the outer surface of the abrasive layer. The matrix may be ceramic or metal.

19 Claims, 3 Drawing Sheets

SPALL RESISTANT ABRADABLE TURBINE AIR SEAL

BACKGROUND

Gas turbine engines include compressor rotors with a plurality of rotating compressor blades. Minimizing the leakage of air between tips of the compressor blades and a casing of the gas turbine engine increases the efficiency of the gas turbine engine as the leakage of air over the tips of the compressor blades can cause aerodynamic efficiency losses. To minimize leakage, the gap at tips of the compressor blades is set so small that at certain conditions, the blade tips may rub against and engage an abradable seal on the casing of the gas turbine. The abradability of the seal material prevents damage to the blades while the seal material itself wears to generate an optimized mating surface and thus reduce the leakage of air.

Cantilevered vanes that seal against a rotor shaft are also used for elimination of the air leakage in turbine engines. Current cantilevered vane tip sealing requires that the tip gaps need to be set more open than desired in order to prevent rub interactions that can cause rotor shaft spallation, vane damage or rotor shaft burn through caused by thermal runaway events during rubs. Current materials have been shown to lack the durability to prevent spallation and they lack the abradability to prevent vane damage.

SUMMARY

The present invention is an abrasive coating that comprises a low strength, abrasive composite top layer on a bond coat. The top layer contains an increasing amount of low strength filler in the radial direction of the coating to provide a graded cohesive strength coating so that wear or failure due to rubbing occurs at the surface of the coating. The cohesive strength of the coating may decrease from about 2,000 psi at the junction with the bond coat layer to about 200 psi at its surface. The coating is a composite matrix of yttria stabilized zirconia, gadolinia-zirconate, hafnia, mullite or alumina that is produced by thermal spray of the ceramic particles. Also included is a quantity of hexagonal boron nitride (hBN). A base bond coat may be MCr, MCrAl, MCrAlY or a refractory modified MCrAlY, where M is nickel, cobalt, iron or mixtures thereof.

When added thermal protection is needed, the coating may also include an intermediate layer between the abrasive composite top layer and the bond coat. The intermediate layer comprises a ceramic layer that acts as a thermal barrier to protect the rotor shaft. Ceramic layers include zirconia, hafnia, mullite, and alumina. The intermediate layer also has higher shear strength than the top coating.

DETAILED DESCRIPTION

Figure 1:
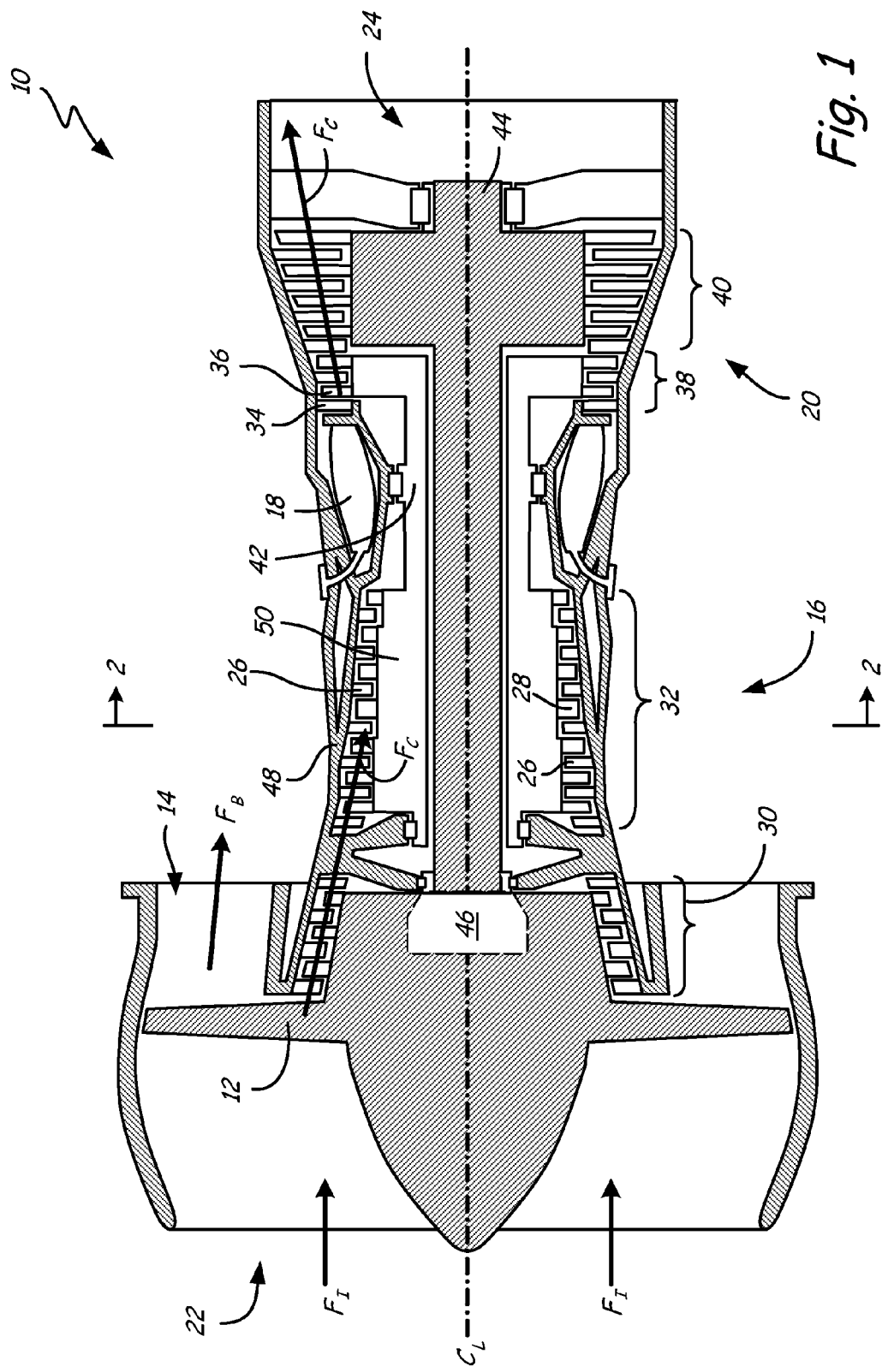
FIG. 1 illustrates a simplified cross-sectional view of a gas turbine engine.

FIG. 1 is a cross-sectional view of gas turbine engine 10, in a turbofan embodiment. As shown in FIG. 1, turbine engine 10 comprises fan 12 positioned in bypass duct 14, with bypass duct 14 oriented about a turbine core comprising compressor (compressor section) 16, combustor (or combustors) 18 and turbine (turbine section) 20, arranged in flow series with upstream inlet 22 and downstream exhaust 24.

Compressor 16 comprises stages of compressor vanes 26 and blades 28 arranged in low pressure compressor (LPC) section 30 and high pressure compressor (HPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 50, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly) to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 comprises any of a high-bypass turbofan, a low-bypass turbofan or a turboprop engine, and the number of spools and the shaft configurations may vary.

In operation of turbine engine 10, incoming airflow $F_I$ enters inlet 22 and divides into core flow $F_C$ and bypass flow $F_B$, downstream of fan 12. Core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on embodiment, fan 12 also provides some degree of compression (or pre-compression) to core flow $F_C$, and LPC section 30 may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36. Turbine vanes 34 turn and accelerate the flow, and turbine blades 36 generate lift for conversion to rotational energy via HPT shaft 50, driving HPC section 32 of compressor 16 via HPT shaft 50. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2:
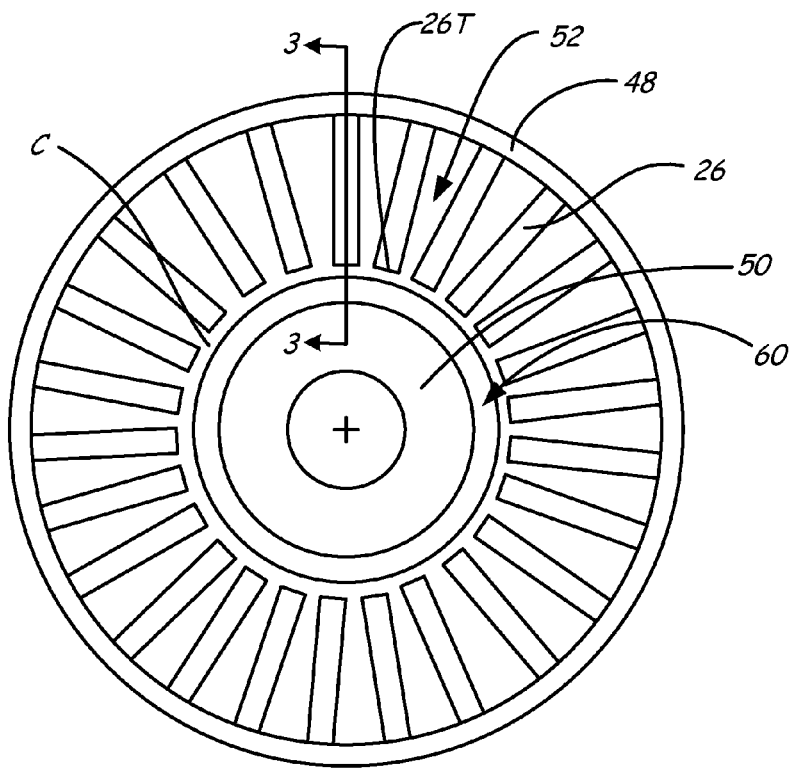
FIG. 2 illustrates a simplified cross sectional view of a rotor shaft inside a casing illustrating the relationship of the rotor and cantilevered vanes taken along the line 2-2 of FIG. 1, not to scale.
Figure 3:
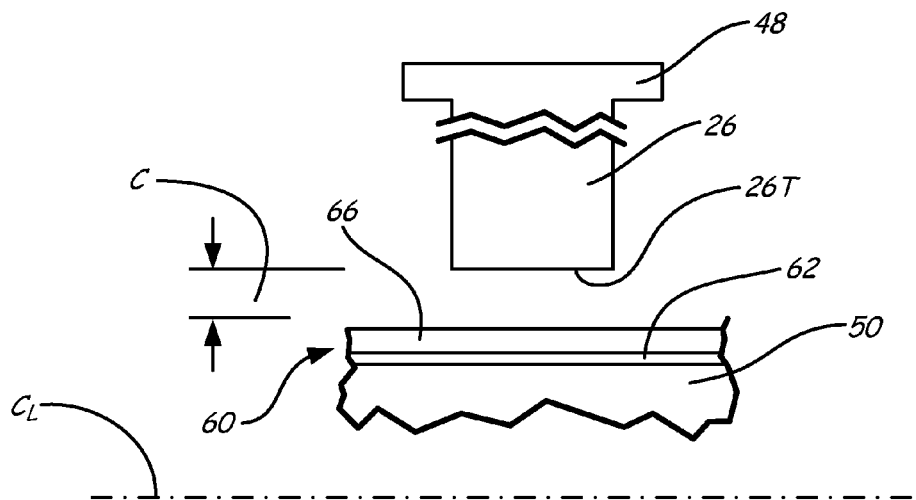
FIG. 3 is a cross sectional view taken along the line 3-3 of FIG. 2, not to scale.

FIG. 2 is a cross section along line 22 of FIG. 1 of a casing 48 which has a rotor shaft 50 inside. Vanes 26 are attached to casing 48 and the gas path 52 is shown as the space between vanes 26. Coating 60, corresponding to the coating of this invention, is on rotor shaft 50 such that the clearance C between coating 60 and vane tips 26T of vanes 26 has the proper tolerance for operation of the engine, e.g., to serve as a seal to prevent leakage of air (thus reducing efficiency), while not interfering with relative movement of the vanes and rotor shaft. In FIGS. 2 and 3, clearance C is expanded for purposes of illustration. In practice, clearance C may be, for example, in a range of about 0.025 inches to 0.055 inches when the engine is cold and 0.000 to 0.035 inches during engine operation, depending on the specific operating conditions and previous rub events that may have occurred.

FIG. 3 shows the cross section along line 3-3 of FIG. 2, with casing 48 and vane 26. Coating 60 is attached to rotor shaft 50, with a clearance C between coating 60 and vane tip 26T of vane 26 that varies with operating conditions, as described herein.

FIG. 3 shows an embodiment comprising bi-layer coating 60 in which includes metallic bond coat 62 and abradable layer 66. Metallic bond coat 62 is applied to rotor shaft 50. Abradable layer 66 is deposited on top of bond coat 62 and is the layer that first encounters vane tip 26T.

Bond coat 62 is thin, up to 10 mils, more specifically ranging from about 3 mils to about 7 mils (about 76 to about 178 microns). Abradable coating 66 is about the same thickness as bond coat 64, again ranging from about 3 mils to about 7 mils (about 76 to about 178 microns).

Bond coat 62 may be formed of MCrAlY, the metal (M) can be nickel, iron, or cobalt, or combinations thereof and the alloying elements are chromium (Cr), aluminum (Al) and yttrium (Y). For example, bond coat 62 may be 15-40% Cr 6-15% Al, 0.61 to 1.0% Y and the balance is cobalt, nickel or iron and combinations thereof. It is applied in a conventional air plasma spray process.

Top abrasive layer 66 thickness may be relatively thin for smaller engine applications at about the same thickness as the bond coat layer 62, ranging from about 3 mils to about 7 mils (about 76 to about 178 microns) or it may be about 100 mils or more for larger engine applications. The required thickness depends on the size and characteristics of the specific engine application. For current aero-engine applications in the 10,000 to 35,000 pound thrust range, the ideal abrasive layer thickness is about 5 to 15 mils. Abrasive layer 66 includes a low strength filler such as hexagonal boron nitride (hBN) in an abrasive matrix. The abrasive matrix may be any matrix used in aero-engine applications. Two specific matrix materials are ceramic matrixes and metal matrixes.

The ceramic matrix may be yttria stabilized zirconia or gadolinia-zirconate that is produced by thermal spray of ceramic particles. The amount of hBN ranges from about 5% to about 80%, based on the volume of the coating, with the lowest concentration at the junction with bond coat 62.

The metal matrix may be selected from any suitable type of metal for an intended application. For example, the metal matrix may be selected from nickel, copper, molybdenum, aluminum or other metals. The metal matrix may also be an alloy, such as a nickel alloy, such as those disclosed in commonly owned U.S. Pat. Nos. 5,536 and 5,780,116. Other metal matrix materials are also within the scope of this invention.

What is essential is that the amount of hBN or other low strength filler in abrasive layer 66 increases from the point of contact with bond coat layer 62 to the outer surface of abrasive layer 66. The cohesive strength of abrasive layer 66 will range from about 2000 psi at the boundary with bond coat layer 66 to about 200 psi to 300 psi at the surface of abrasive layer 66. Because the amount of hBN or low strength filler increases and the cohesive strength decreases, any rubbing or other stress on abrasive layer 66 will cause abrasion of the layer at the surface. Any potential failure or wear will take place at the surface so that large quantities of spalling does not take place.

As noted above, hBN functions as a low strength filler in abrasive layer 66. Other conventional low strength fillers such as bentonite clay may be used.

Top abrasive layer 66 is applied with a Sulzer Metco 3MB air plasma spray (APS) torch setup that includes a G nozzle. Process gasses are set in standard cubic feet per hour (SCFH) as follow: Argon plasma gas 85. Hydrogen plasma gas, 12. Argon powder carrier gas, 9. The torch to part distance is 4.25 inches. The part is set on a turntable and rotated to achieve a surface speed of 120 feet per minute with an axial motion per revolution of the part of 0.2 inches. As abrasive layer 66 is built up, the amount of hBN or other low strength filler is increased by changing the feed rates so that a higher concentration of hBN or other low strength filler is achieved. The feed rate for aluminum oxide powder is 60 g/minute and is uniformly ramped down to 15 g/minute during coating buildup. The feed rate for hBN is initially 5 g/minute and ramped up to 25 g/minute at the completion of coating. Because the cohesive strength of abrasive layer 66 has a gradient axially inward to a maximum at bond coat layer 62, wear and failure remains at the surface. What is also achieved is significantly improved clearance control because the abrasive layer 66 and the vane tips 26T both incur some shared shear, so that both abrade and a better seal is achieved.

Figure 4:
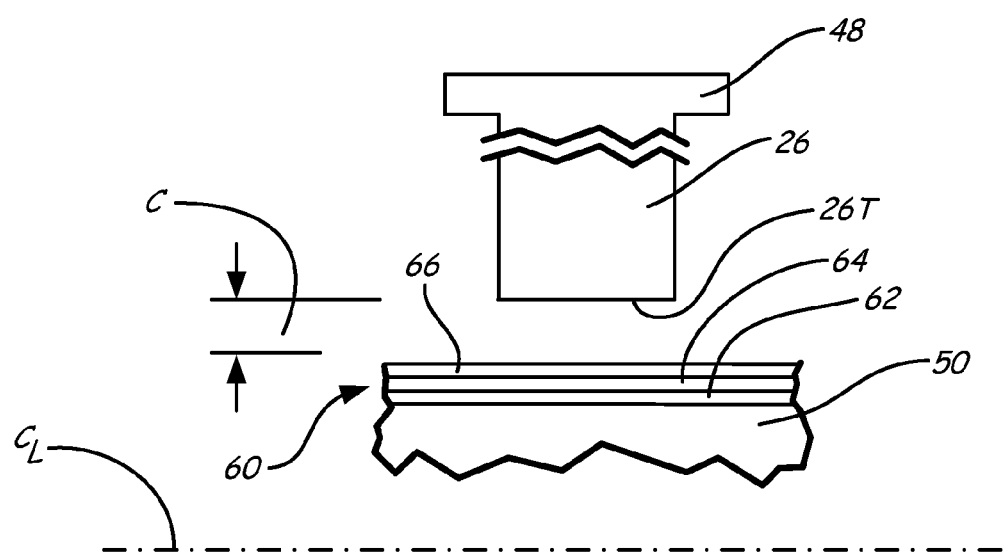
FIG. 4 is a cross sectional view of another embodiment.

Optional ceramic layer 64, shown in FIG. 4, may be any of the zirconia based ceramics such as are described in commonly U.S. Pat. Nos. 4,861,618, 5,879,573, 6,102,656 and 6,358,002 which are incorporated by reference herein in their entirety. Zirconia stabilized with 6-8 wt. % yttria is one example of such a ceramic layer 64. Other examples are zirconia stabilized with ceria, magnesia, calcia, mullite and mixtures thereof. Optional thermally insulating ceramic layer 64 thickness may range from about 7 mils to about 12 mils (about 178 to about 305 microns). In many instances, there is no need for optional thermally insulating ceramic layer 64 because abrasive coating 66 functions to remove material by low temperature abrasion minimizing or eliminating thermal burn through of the rotor in high interaction rate events. In any event, if an optional ceramic layer 64 is employed, the cohesive strength of abrasive layer 66 again is strongest at the junction of the layers and weakest at its surface, as set forth above.

Alternatively to the ceramic abrasive layer that has been described, a metallic matrix material may be used. In this configuration, it may be more conventional to describe the top layer of the coating as abradable as opposed to abrasive, however this is a matter of semantics. Just as the ceramic coating results abrasive wear of the airfoil tips and a resultant wear ratio, the metallic matrix coating has a wear ratio with the airfoil tips that is caused by sliding contact wear.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An abrasive coating for a rotor shaft, the abrasive coating comprising:
   a metal bond coat layer on the rotor shaft;
   an abrasive layer over the bond coat layer for contact with vanes during operation of the rotor shaft comprising a metal matrix containing a ceramic abrasive material and a low strength filler material with a concentration of the filler material increasing radially outward from the bond coat layer to the outer surface of the abrasive layer and a concentration of the ceramic abrasive material decreasing radially outward from the bond coat layer to the outer surface; and
   wherein the abrasive layer forms an abradable air seal with cantilevered vanes.

2. The abrasive coating of claim 1, wherein the metal bond coat layer ranges in thickness from about 3 mils to about 7 mils (about 76 to about 178 microns).

3. The abrasive coating of claim 1, wherein the metal bond coat layer is formed of at least one of MCrAl, MCrAlY and a refractory modified MCrAlY, where M is nickel, iron, cobalt or mixtures thereof.

4. The abrasive coating of claim 1, wherein the low strength filler material comprises hexagonal boron nitride (hBN) and the ceramic abrasive material comprises yttria stabilized zirconia or gadolinia-zirconate and wherein the amount of hBN in the coating ranges from about 5% to about 80%, based on the volume of the coating.

5. The abrasive coating of claim 1, wherein the metal matrix is selected from the group consisting of nickel, copper, molybdenum, aluminum, and alloys thereof.

6. The abrasive coating of claim 1, wherein the abrasive layer has a cohesive strength at the point of contact with the metal bond coat layer of about 2,000 psi and a cohesive strength at its surface of about 200 psi.

7. The abrasive coating of claim 1, which further includes a ceramic layer between the metal bond coat layer and the abrasive layer, the ceramic layer having a thickness ranging from about 7 mils to about 12 mils (about 178 to about 305 microns).

8. An abrasive coating for a rotor shaft, the abrasive coating comprising:
   a metal bond coat layer on the rotor shaft ranging in thickness from about 3 mils to about 7 mils (76 to 178 microns); and
   an abrasive layer comprising a metal matrix containing a ceramic abrasive material and hexagonal boron nitride (hBN) overlying the metal bond coat layer for contact with cantilevered vanes during operation of the rotor shaft to form an abradable air seal, the abrasive layer having a concentration of hBN increasing radially outward from the bond coat layer to the outer surface of the abrasive layer, a concentration of the ceramic abrasive material decreasing radially outward from the bond coat layer to the outer surface of the abrasive layer, and a thickness from about 3 mils to about 7 mils (about 76 to about 178 microns).

9. The abrasive coating of claim 8, wherein the ceramic abrasive material includes yttria stabilized zirconia or gadolinia-zirconate and the amount of hBN ranges from about 5% to about 80%, based on the volume of the coating.

10. The abrasive coating of claim 8, wherein the metal matrix is selected from the group consisting of nickel, copper, molybdenum, aluminum, and alloys thereof.

11. The abrasive coating of claim 8, wherein the abrasive layer has a cohesive strength at the point of contact with the metal bond coat layer of about 2,000 psi and a cohesive strength at its surface of about 200 psi.

12. The abrasive coating of claim 8, wherein the metal bond coat layer is formed of MCrAlY, where M is nickel or cobalt, and the alloying elements are chromium (Cr), aluminum (Al) and yttrium (Y).

13. The abrasive coating of claim 8, which further includes a ceramic layer between the metal bond coat layer and the abrasive layer, the ceramic layer having a thickness of from about 7 mils to about 12 mils (about 177.8 to about 304.8 microns).

14. A compressor for a gas turbine engine comprising:
   a rotor having a plurality of axially spaced stages of compressor blades attached thereto and extending outward from a rotor shaft;
   a plurality of axially spaced stages of cantilevered vanes extending inward toward the rotor shaft for contact with a portion of the rotor shaft; and
   an abrasive coating on the portion of the rotor shaft comprising a metal bond coat layer and an abrasive layer on the metal bond coat layer containing a metal matrix, a ceramic abrasive material, and hexagonal boron nitride (hBN) for forming abradable air seals with the cantilevered vanes, wherein the abrasive layer has a concentration of hBN increasing radially outward from the metal bond coat layer to the outer surface of the abrasive layer, and a concentration of the ceramic abrasive material decreasing radially outward from the bond coat layer to the outer surface of the abrasive layer.

15. The compressor of claim 14, wherein the abrasive layer has a cohesive strength at the point of contact with the metal bond coat layer of about 2,000 psi and a cohesive strength at its surface of about 200 psi.

16. The compressor of claim 14, wherein the ceramic abrasive material includes yttria stabilized zirconia or gadolinia-zirconate and the amount of hBN in the abrasive coating ranges from about 5% to about 80%, based on the volume of the coating.

17. The compressor of claim 14, wherein the metal matrix is selected from at least one of the group consisting of nickel, copper, molybdenum, aluminum, and alloys thereof.

18. The compressor of claim 14, wherein the metal bond coat layer is formed of MCrAlY, where M is nickel or cobalt, and the alloying elements are chromium (Cr), aluminum (Al) and yttrium (Y).

19. The compressor of claim 14, which further includes a ceramic layer between the metal bond coat layer and the abrasive layer, the ceramic layer having a thickness of from about 7 mils to about 12 mils (about 177.8 to about 304.8 microns).

* * * * *

UNITED STATES PATENT AND TRADEMARK OFFICE
CERTIFICATE OF CORRECTION

PATENT NO.        : 8,876,470 B2                                     Page 1 of 1
APPLICATION NO.   : 13/171569
DATED             : November 4, 2014
INVENTOR(S)       : Christopher W. Strock and Paul W. Baumann It is certified that error appears in the above-identified patent and that said Letters Patent is hereby corrected as shown below:

IN THE CLAIMS:

Col. 6, Line 59
  Delete "at least one of"

Signed and Sealed this
Seventeenth Day of February, 2015

Michelle K. Lee
*Deputy Director of the United States Patent and Trademark Office*